United States Patent
Fischer

(10) Patent No.: US 8,738,603 B2
(45) Date of Patent: May 27, 2014

(54) METRICS-BASED ACCESSING OF SOCIAL THREADS

(75) Inventor: Ronald F. Fischer, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 193 days.

(21) Appl. No.: 13/111,183

(22) Filed: May 19, 2011

(65) Prior Publication Data
US 2011/0289097 A1 Nov. 24, 2011

Related U.S. Application Data

(60) Provisional application No. 61/346,839, filed on May 20, 2010.

(51) Int. Cl.
*G06F 17/30* (2006.01)

(52) U.S. Cl.
USPC .......................................... 707/709; 707/751

(58) Field of Classification Search
USPC ......... 705/27.1; 707/707, 727, 709, 751, 754, 707/999.101, 999.201; 709/231, 217, 219, 709/214, 224; 715/738
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |

(Continued)

OTHER PUBLICATIONS

U.S. Office Action dated Dec. 24, 2012 issued in U.S. Appl. No. 13/155,656.

(Continued)

*Primary Examiner* — Marc Filipczyk
(74) *Attorney, Agent, or Firm* — Weaver Austin Villeneuve & Sampson LLP

(57) ABSTRACT

A method of accessing feeds based on metrics is provided. Feeds, each associated with an object stored in a database system, are provided to users of the database system. Inferential user interaction data captures implicit user behavior of users of the database system, wherein the data is generated in relation to a feed. Feed metrics are determined based on the user interaction data, wherein a feed metric is based upon statistics comprising user consumption, user responsiveness, content proliferation, and feed life. Finally, an action is executed in relation to at least one feed based on the feed metrics, wherein the action comprises discontinuing the feed, characterizing a feed, determining that a feed can be monetized, determining that a feed should be cached, or determining that intervention in a feed is advisable.

17 Claims, 3 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,620,697 B1 * | 11/2009 | Davies .......................... 709/217 |
| 7,644,122 B2 | 1/2010 | Weyer et al. |
| 7,668,861 B2 | 2/2010 | Steven |
| 7,669,123 B2 | 2/2010 | Zuckerberg et al. |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Assal et al. |
| 7,881,983 B2 * | 2/2011 | Pitkow ......................... 705/26.3 |
| 7,933,884 B2 * | 4/2011 | Menezes et al. ............... 707/706 |
| 7,945,653 B2 | 5/2011 | Zuckerberg et al. |
| 8,005,896 B2 | 8/2011 | Cheah |
| 8,015,495 B2 | 9/2011 | Achacoso et al. |
| 8,060,634 B1 * | 11/2011 | Darnell et al. ................. 709/231 |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 8,335,763 B2 | 12/2012 | Narayanan et al. |
| 8,352,499 B2 | 1/2013 | Bharat et al. |
| 8,380,803 B1 | 2/2013 | Stibel et al. |
| 8,484,111 B2 | 7/2013 | Frankland et al. |
| 8,533,719 B2 * | 9/2013 | Fedorova et al. ............. 718/102 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0267973 A1 | 12/2005 | Carlson et al. |
| 2007/0061266 A1 | 3/2007 | Moore et al. |
| 2007/0208687 A1 | 9/2007 | O'Conor et al. |
| 2007/0214097 A1 | 9/2007 | Parsons et al. |
| 2008/0040673 A1 | 2/2008 | Zuckerberg et al. |
| 2008/0249972 A1 | 10/2008 | Dillon |
| 2008/0275884 A1 | 11/2008 | Yoshida et al. |
| 2009/0049053 A1 | 2/2009 | Barker et al. |
| 2009/0063415 A1 | 3/2009 | Chatfield et al. |
| 2009/0160658 A1 | 6/2009 | Armstrong et al. |
| 2009/0172773 A1 | 7/2009 | Moore |
| 2009/0177484 A1 | 7/2009 | Davis et al. |
| 2009/0222750 A1 | 9/2009 | Jain et al. |
| 2010/0057682 A1 | 3/2010 | Ramsay et al. |
| 2010/0083124 A1 | 4/2010 | Druzgalski et al. |
| 2010/0144318 A1 | 6/2010 | Cable |

(56) References Cited

U.S. PATENT DOCUMENTS

| | | |
|---|---|---|
| 2010/0146054 A1 | 6/2010 | Armstrong et al. |
| 2010/0159995 A1 | 6/2010 | Stallings et al. |
| 2010/0268830 A1 | 10/2010 | McKee et al. |
| 2010/0325107 A1 | 12/2010 | Kenton et al. |
| 2011/0004831 A1 | 1/2011 | Steinberg et al. |
| 2011/0087534 A1 | 4/2011 | Strebinger et al. |
| 2011/0145881 A1 | 6/2011 | Hartman et al. |
| 2011/0153595 A1 | 6/2011 | Bernstein et al. |
| 2011/0153646 A1 | 6/2011 | Hong et al. |
| 2011/0161444 A1 | 6/2011 | Chauhan |
| 2011/0173283 A1 | 7/2011 | Puthenkulam et al. |
| 2011/0173570 A1 | 7/2011 | Moromisato et al. |
| 2011/0179020 A1 | 7/2011 | Ozzie et al. |
| 2011/0179378 A1 | 7/2011 | Wheeler et al. |
| 2011/0225146 A1 | 9/2011 | Boswell |
| 2011/0246910 A1 | 10/2011 | Moxley et al. |
| 2011/0258561 A1 | 10/2011 | Ladouceur et al. |
| 2011/0264656 A1 | 10/2011 | Dumais et al. |
| 2011/0282941 A1 | 11/2011 | Chan et al. |
| 2011/0314029 A1 | 12/2011 | Fischer et al. |
| 2012/0001919 A1 | 1/2012 | Lumer |
| 2012/0059795 A1 | 3/2012 | Hersh et al. |
| 2012/0102420 A1 | 4/2012 | Fukahori |
| 2012/0158714 A1 | 6/2012 | Dumant |
| 2012/0203831 A1 | 8/2012 | Schoen et al. |
| 2012/0223951 A1 | 9/2012 | Dunn et al. |
| 2012/0290407 A1 | 11/2012 | Hubbard et al. |
| 2012/0331053 A1 | 12/2012 | Dunn |
| 2013/0018955 A1 | 1/2013 | Thaxton et al. |
| 2013/0021370 A1 | 1/2013 | Dunn et al. |
| 2013/0024454 A1 | 1/2013 | Dunn |
| 2013/0024511 A1 | 1/2013 | Dunn et al. |
| 2013/0024788 A1 | 1/2013 | Olsen et al. |
| 2013/0060859 A1 | 3/2013 | Olsen et al. |
| 2013/0061156 A1 | 3/2013 | Olsen et al. |

OTHER PUBLICATIONS

U.S. Office Action dated Apr. 26, 2013 issued in U.S. Appl. No. 13/112,805.

"Google Plus Users", Google+Ripples, Oct. 31, 2011 [retrieved on Feb. 21, 2012 from Internet at http://www.googleplusers.com/google-ripples.html], 3 pages.

U.S. Final Office Action dated Aug. 15, 2013 issued in U.S. Appl. No. 13/155,656.

U.S. Office Action (Advisory Action) dated Nov. 1, 2013 issued in U.S. Appl. No. 13/155,656.

U.S. Office Action dated Oct. 28, 2013 issued in U.S. Appl. No. 13/280,086.

U.S. Office Action dated Aug. 30, 2013 issued in U.S. Appl. No. 13/363,081.

U.S. Office Action dated Sep. 23, 2013 issued in U.S. Appl. No. 13/447,643.

U.S. Final Office Action dated Oct. 4, 2013 issued in U.S. Appl. No. 13/112,805.

Chong, Frederick; Carraro, Gianpaolo; and Wolter, Roger; "Multi-Tenant Data Architecture," Microsoft Developer Network [database online], [retrieved on Sep. 5, 2013]. Retrieved from the Internet URL: msdn.microsoft.com/en-us/library/aa479086.aspx#mlttntda_topic6, 25 pp.

* cited by examiner

METRICS-BASED ACCESSING OF SOCIAL THREADS

CROSS REFERENCE TO RELATED APPLICATIONS

The present application claims benefit under 35 USC §119 (e) of U.S. Provisional Application No. 61/346,839, entitled "METRICS BASED ACCESSING OF SOCIAL THREADS AND RULE BASED PRIORITIZATION OF SOCIAL DATA," filed on May 20, 2010, by Ronald F. Fischer, the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to database systems, and more particularly to determining metrics for social data to allow for filtering and monitoring social data such as threads.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

The present invention provides systems, apparatus, and methods for social data analysis, and more particularly to determining metrics for social data to allow for filtering and monitoring social data such as threads.

A method of accessing feeds based on metrics is provided. A plurality of feeds are provided to a plurality of users of a database system, wherein each feed in the plurality of feeds is associated with an object stored in a database system. Inferential user interaction data is collected from the plurality of users, wherein the inferential user interaction data is generated in relation to at least one of the plurality of feeds, and wherein the inferential user interaction data captures implicit user behavior of at least one of the plurality of users of the database system. From the user interaction data, one or more feed metrics are determined, using one or more processors associated with the one or more servers. A feed metric may be based upon statistics comprising user consumption, user responsiveness, content proliferation, and feed life. The one or more feed metrics may be weighted or prioritized. Finally, an action is executed in relation to the at least one of the plurality of feeds based on the one or more weighted feed metrics, wherein the action comprises discontinuing the feed, characterizing a feed, determining that a feed can be monetized, determining that a feed should be cached, or determining that intervention in a feed is advisable.

While the present invention is described with reference to an embodiment in which techniques for performing searches of feeds in an on-demand enterprise services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

In the following drawings like reference numbers are used to refer to like elements. Although the following figures depict various examples of the invention, the invention is not limited to the examples depicted in the figures.

DEFINITIONS

Figure 1:
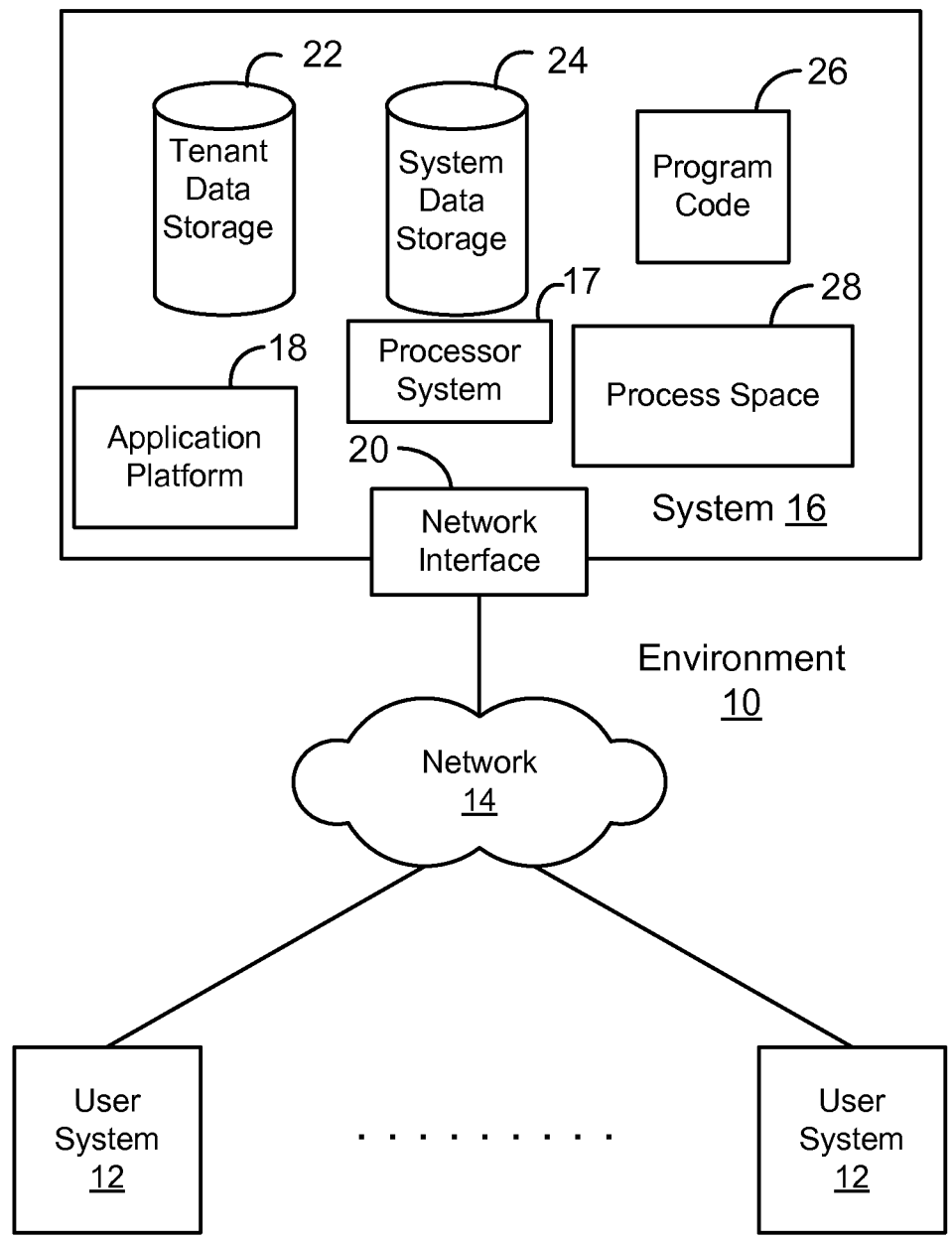
FIG. 1 illustrates a block diagram of an environment wherein an on-demand database service might be used.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers. As used herein, the term "query plan" refers to a set of steps used to access information in a database system.

As used herein, the term "user's profile" includes data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company that is a tenant of the database system that provides a database service.

As used herein, the term "record" refers to an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying to get. In one embodiment implementing a multi-tenant database, all of the records for the tenants have an identifier stored in a common table. A record has data fields that are defined by the structure of the object (e.g. fields of certain data types and purposes). A record can also have custom fields defined by a user. A field can be another record or include links thereto, thereby providing a parent-child relationship between the records.

As used herein, the term "feed" includes a combination (e.g. a list) of feed items. As user herein, the term "feed item" (or feed element) refers to information associated with (posted by or addressed to) a user ("profile feed") of the database or information about a record ("record feed") in the database. A user following the user or record can receive the associated feed items. The feed items from all of the followed users and records can be combined into a single feed for the user. In some embodiments, a "feed item" may be (1) a message or (2) a story (also called a feed tracked change). A feed may be a combination of multiple types of feed items.

A "message" includes text created by a user, and may include other data as well. Examples of messages include posts, status updates, and comments. Messages can be created for a user's profile or for a record. Posts can be created by various users, potentially any user, although some restrictions can be applied. As an example, posts can be made to a wall section of a user's profile (which can include a number of recent posts) or a section of a record that includes multiple posts. The posts can be organized in chronological order. In contrast to a post, a status update changes a status of a user and is made by that user. Other similar sections of a user's profile can also include an "About" section. A record can also have a status, whose update can be restricted to the owner of the record. The owner can be a single user, multiple users, or a group. In one embodiment, there is only one status for a record. In one embodiment, a comment can be made on any feed item. In another embodiment, comments are organized as a list explicitly tied to a particular story, post, or status update. In this embodiment, comments may not be listed in the first layer (in a hierarchal sense) of feed items, but listed as a second layer branching from a particular first layer feed item.

A "story" is data representing an event, and can include text generated by the database system in response to the event. In one embodiment, the data can initially be stored, and then the database system can later use the data to create text for describing the event. Both the data and/or the text can be a story, as used herein. In various embodiments, an event can be an update of a record and/or can be triggered by a specific action by a user. Which actions trigger an event can be configurable. Which events have stories created and which stories are sent to which users can also be configurable. Messages and stories can be stored as a field or child object of the record. For example, the feed can be stored as a child object of the record.

As used herein, a "group" is a collection of users. In some aspects, the group may be defined as users with a same or similar attribute, or by membership. In one embodiment, a "group feed" includes any feed item about any user in a group. In another embodiment, a "group feed" includes feed items that are about the group as a whole. In one implementation, the feed items for a group are only posts and comments.

As used herein, an "entity feed" or "record feed" refers to a feed of feed items about a particular record in the database, such as stories about changes to the record and posts made by users about the record. An entity feed can be composed of any type of feed item. Such a feed can be displayed on a page (e.g. a web page) associated with the record (e.g. a home page of the record). As used herein, a "profile feed" is a feed of feed items about a particular user. In one embodiment, the feed items for a profile feed are posts and comments that other users make about or send to the particular user, and status updates made by the user. Such a profile feed can be displayed on a page associated with the particular user. In another embodiment, feed items in a profile feed could include posts made by the particular user and feed tracked changes (stories) initiated based on actions of the particular user.

DETAILED DESCRIPTION

The present invention provides systems and methods for social data analysis, and more particularly for determining metrics for social data to allow for filtering and monitoring social data such as threads. The various embodiments are particularly useful in an on-demand multi-tenant database and/or application service.

General Overview

Systems, apparatus, and methods are provided for implementing enterprise level social and business information networking Such embodiments can provide more efficient use of a database system. For instance, a user of a database system may not easily know when important information in the database has changed, e.g., about a project or client. Embodiments can provide stories about such changes and other events, thereby keeping users informed.

By way of example, a user can update a record (e.g. an opportunity such as a possible sale of 1000 computers). Once the update has been made, a story about the update can then automatically be sent (e.g. in a feed) to anyone subscribing to the opportunity or to the user. Thus, the user does not need to contact a manager regarding the change in the opportunity, since the story about the update is sent via a feed right to the manager's feed page (or other page).

Next, mechanisms and methods for providing systems and methods for implementing enterprise level social and business information networking will be described with reference to example embodiments.

System Overview

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level (profile type) may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that embodiments might be use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
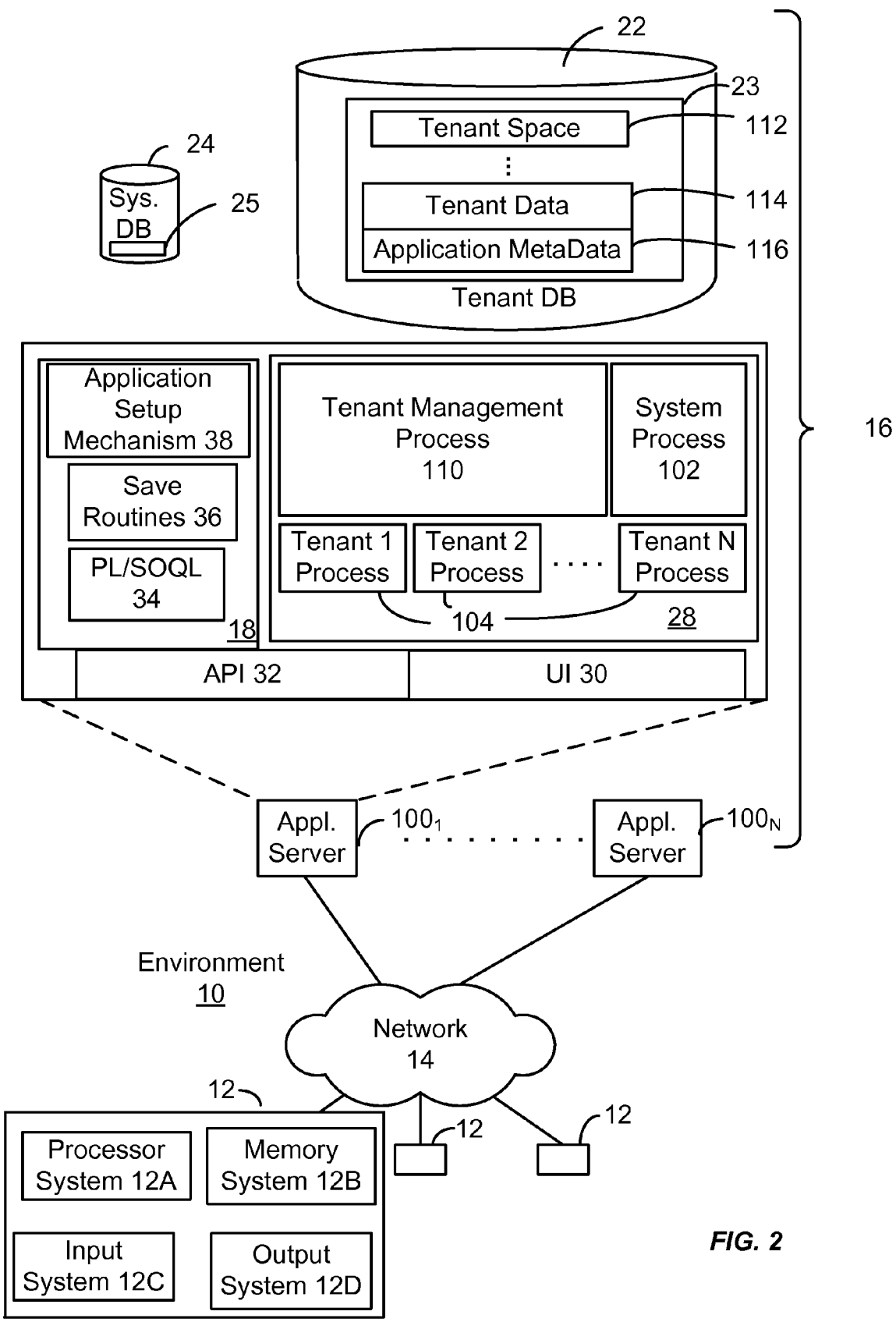
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present embodiments. It should be understood that "table" and "object type" may be used interchangeably herein. Each table generally contains one or more data categories logically arranged as columns or fields in a viewable schema. Each row or record of a table contains an instance of data for each category (type) defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, Opportunity data, and other object types, each containing pre-defined fields. It should be understood that the word "entity" may also be used interchangeably herein with "object" and "table", when entity or object is referring to a collection of objects or entities of a particular type.

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "Custom Entities and Fields in a Multi-Tenant Database System", by Craig Weissman, filed Apr. 2, 2004, which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Metrics Based Accessing of Social Feeds

Many social networking systems offer explicit filtering of social threads (or feeds). Feeds are generally filtered by: user, group, channel, subject, or keyword. These are all quite useful for viewing feeds, but there is also a need to access message feeds based upon feed metrics that track user behavior. With the explosion of social data, feed metrics will become more useful for filtering and monitoring within social applications.

Conventionally, feeds provided through internet browsing software have provided simple metrics, such as how many subscribers a feed has, or how many total messages a feed currently includes. Feeds also often provide a way to explicitly indicate that the user finds a particular feed item to be important or useful (e.g., FaceBook's "Like" function). Software, such as the salesforce.com Chatter® Desktop, or a sophisticated Internet browser, that is able to provide a detailed level of feedback regarding implicit user behavior may allow for detection of more subtle user behavior on their computer, such as (1) performing a "mouse-over" of a given location even if no click occurs, (2) the duration of time a user passively views a designated area of content, (3) viewing the comments on a message, (4) "highlighting" (a.k.a. "selecting" text or an image), (5) copying the text of a feed, (6) expanding long messages from a truncated form, or (7) "zooming in" (increasing the view of the page). In addition, other user actions, while not so subtle, may also implicitly indicate user interest, such as commenting on a message, or explicitly forwarding a feed item to someone else. The ability to detect user behavior the implicitly indicates user interest in a feed item enables the collection of detailed user interaction data, which enables assessment of novel feed metrics.

Figure 3:
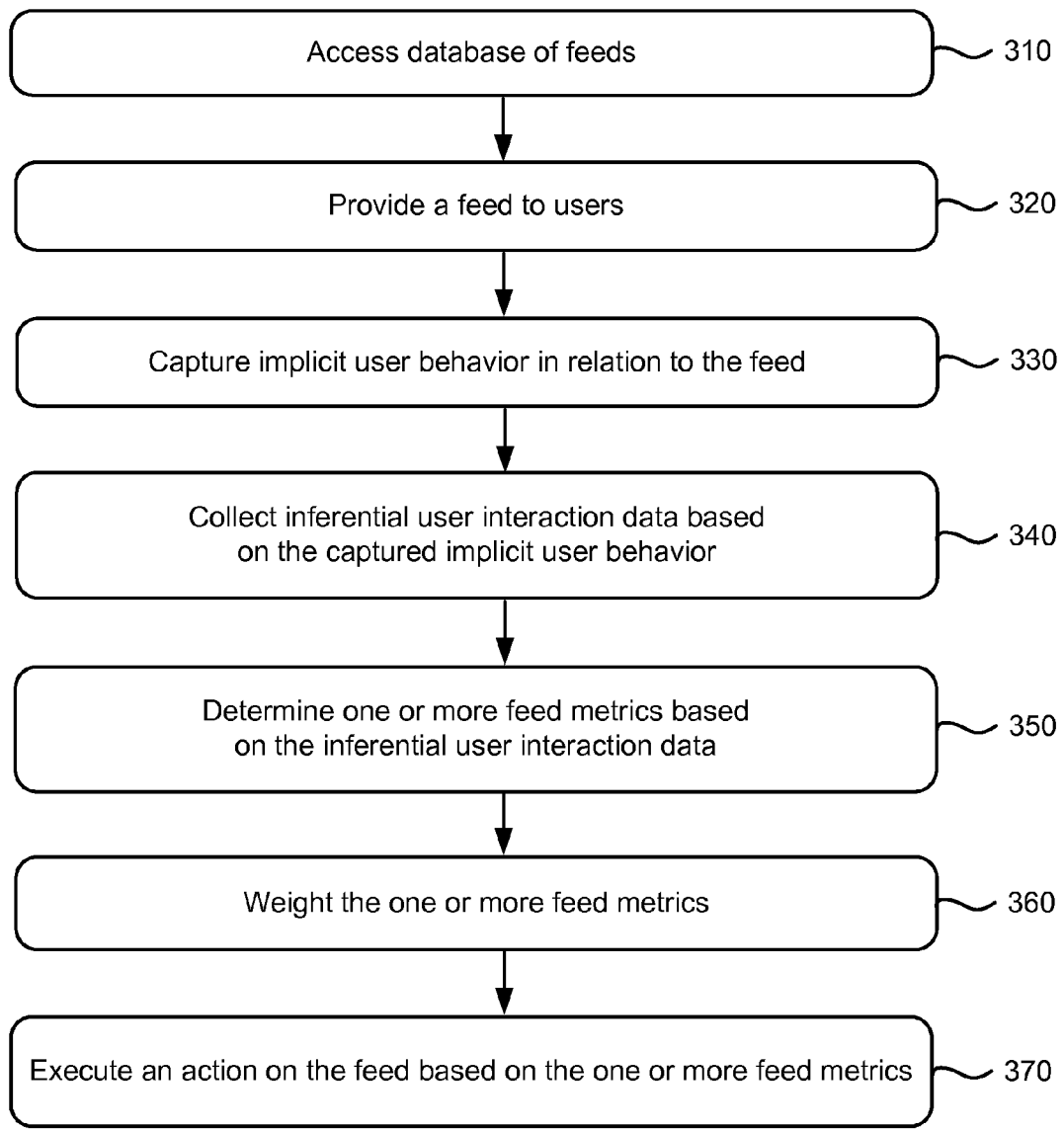
FIG. 3 is a flowchart of a method 300 for determining metrics for social data.

FIG. 3 is a flowchart of a method 300 for accessing feeds based on feed metrics. The system accesses a database of feeds (310) and provides a feed to a network of users of the database (320).

In one embodiment, client software installed on a user's computer (e.g., Chatter® Desktop) is able to use APIs built into the operating system to detect the use of peripheral input devices, such as the motion and button clicks of a mouse and keystrokes from a keyboard. In this manner, the client software is able to detect implicit user behavior, such as the duration of time that a user kept their mouse over a popup transient notification to hold it open (and prevent it from disappearing after just few seconds), or, on a mobile device, the duration of time after a user enlarged some text or an image using a pinch-zoom motion. Another example of detecting implicit user behavior may include measuring the speed with which a user reacts to a notification (whether visual or auditory, etc.)—for example, upon receiving a notification, how quickly did the user react to the notification, e.g., by rapidly sliding their mouse over to a control interface (or, on a mobile device, pressing a button or tilting the device) to mute an alert sound. The users view feed items and interact with the feed—implicit user behavior is thereby captured (330). From such implicit user behavior, inferential user interaction data can be gathered. Such inferential user interaction data may provide feedback on user behavior that does not involve explicit actions, such as clicking on a link. In one embodiment, sophisticated browser plug-ins (e.g., Flash) may provide the ability to detect implicit user behavior of the type described above.

Such implicit user behavior is captured in inferential user interaction data (e.g., statistics generated by client software on a user's computing device), which is collected (340) and analyzed to determine various feed metrics (350). Analysis of the inferential user interaction data may comprise different aspects of implicit user behavior, such as calculating the average time that a typical user held open a popup notification for a particular feed, or calculating the average number of users who held open the popup notification, or calculating the viral nature of the particular feed (i.e., the acceleration over time in the number of users who affirmatively acted to hold open the popup notification for the particular feed. For any of these actions, another interesting analysis might look at the occurrence of subsequent actions (or lack thereof), such as determining that a high percentage of users take an affirmative action to open and read a particular message but fail to affirmatively indicate interest or perhaps even affirmatively take an action to characterize the message as being of low interest or little use or even offensive.

The various feed metrics may include: metrics that track the user consumption of content from the feed (e.g., a most- and/or least-viewed feed metric), user responsiveness within the context of the feed (e.g., a most- and/or least-commented feed metric, or other user actions to mark or characterize the feed or feed elements), proliferation of content from the feed by users (e.g., a most- and/or least-forwarded feed metric, or a most- and/or least-viral feed metric), and feed life.

In one embodiment, a Most- and/or Least-Commented Feed Metric is used. This metric is determined by counting comments added to a feed, for example, feeds which have the most (or least) comments, or feeds that meet a minimum (maximum) criteria for comments.

In one embodiment, a Most- and/or Least-Viewed Feed Metric is used. Four possible ways of generating this metric include:

1) The time during which a feed is 'on screen' or viewable by the user.

2) Whether or not a user viewed comments associated with the feed, regardless of whether they added a new comment.

3) The time during which a feed is on screen or viewable, but only when the user has been determined to actively be using the application, e.g., as measured by user input activity such as mouse or keyboard activity.

4) Whether or not a user chose to hide or delete or otherwise de-prioritize the feed.

In one embodiment, this metric identifies feeds with respect to user views regardless of whether the user comments upon the feed or not (or feeds that meet a minimum criteria for views).

In one embodiment, a Most- and/or Least-Forwarded Feed Metric is used. Forwarding of a feed can be measured, including by:

1) How many times the text of the feed is copied (the actual copy operation can be noted), with the assumption that it will be pasted into a document or some other communication.

2) How many times an operation to get a link or forward a feed is accessed. Again, the operation used to link or forward the feed can be intercepted/noted to create this metric. A simple way to do this is to provide a button to forward a feed. In one embodiment, this metric identifies feeds that are sent to other users in one form or another, or, in the 'least' case, feeds that no one is bothering to forward.

In one embodiment, a Most- and/or Least-Viral Feed Metric is used. The viral nature of a feed can be measured by determining how quickly the rate at which a feed is viewed, forwarded, commented upon, or subscribed to by users increases over a designated period of time.

In one embodiment, a Feed Life Metric is used. This metric identifies feeds that continue to be viewed or receive updates over a long period of time (or feeds that are no longer accessed). In some embodiments, this metric combines the Most-/Least-Viewed and/or the Most-/Least-Forwarded Feed Metrics with the initial and most recent dates on which the feed is accessed to determine the longevity of a feed.

In some embodiments, one or more of the metrics may be weighted (360) according to any conventional methodology. Such weighting of the metrics may affect how combinations of metrics are analyzed.

In some embodiments, a feed metric may be calculated with respect to a subgroup of users, wherein users in the subgroup share some common characteristic. Common characteristics may include demographic similarities, association with a particular organization or object (e.g., Account, Lead, Opportunity), location in a particular geographic region, use of particular types of technology (e.g., accessing a feed from a mobile device using a particular application or version of the operating system), etc.

Finally, the system executes an action with respect to the feed, based on the feed metrics (370). In some embodiments, the system uses the feed metrics to select actions to take. In some embodiments, the system may pass the feed metrics as input to the action and modify the action based on one or more of the feed metrics. In some embodiments, feed metrics may be used to, for example: (1) determine which feeds are important to watch for marketing or support reasons; (2) indicate which feeds are critical to viewers; (3) filter multiple feeds down to a "most important" list for daily viewing; (4) cache commonly accessed feeds; (5) determine whether to discontinue a feed that is not drawing interest; (6) determine whether and/or how to monetize a feed, and (7) automatically assign badges or other distinguishing marks to a feed. Some embodiments using feed metrics are described in further detail in U.S. patent application Ser. No. 13/112,805, which is hereby incorporated by reference for all purposes, and which claims priority to U.S. Patent Appln. No. 61/354,638.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that any of the embodiments of the present invention can be implemented in the form of control logic using hardware and/or using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of accessing feeds based on metrics, the method comprising:

accessing a plurality of feeds, wherein each feed in the plurality of feeds is associated with an object stored in a database system;

providing the plurality of feeds to a plurality of users of the database system;

collecting inferential user interaction data from the plurality of users, wherein the inferential user interaction data is generated in relation to at least one of the plurality of feeds, and wherein the inferential user interaction data captures implicit user behavior of at least one of the plurality of users of the database system, wherein collecting inferential user interaction data comprises receiving data describing implicit user behavior, wherein the data was captured in part by client software operating on a computing device;

determining, using one or more processors associated with the one or more servers, one or more feed metrics based on the inferential user interaction data, wherein a feed metric is based upon statistics for the plurality of users comprising user consumption, user responsiveness, content proliferation, and feed life;

weighting the one or more feed metrics for the plurality of users with respect to each of the plurality of feeds; and executing an action for the plurality of users in relation to the at least one of the plurality of feeds based on the one or more weighted feed metrics, wherein the action comprises discontinuing the feed, characterizing a feed, determining that a feed can be monetized, determining that a feed should be cached, or determining that intervention in a feed is advisable.

2. The method of claim 1, wherein executing an action based on the one or more feed metrics comprises selecting the action to be executed based on the one or more feed metrics.

3. The method of claim 1, wherein executing an action based on the one or more feed metrics comprises providing the one or more feed metrics as input to the action, and wherein the action is modified based on the one or more feed metrics.

4. The method of claim 1, wherein determining the one or more feed metrics based on the inferential user interaction data comprises determining the change in a feed metric over time.

5. The method of claim 1, wherein determining the one or more feed metrics based on the inferential user interaction data comprises determining a feed metric with respect to a subgroup of the plurality of users, wherein users in the subgroup share a common characteristic.

6. The method of claim 1, wherein determining the one or more feed metrics based on the inferential user interaction data comprises determining a first feed metric with respect to a second feed metric.

7. The method of claim 6, wherein determining the one or more feed metrics based on the inferential user interaction data comprises determining average user responsiveness or average user-initiated content proliferation with respect to average user consumption.

8. The method of claim 6, wherein determining the one or more feed metrics based on the inferential user interaction data comprises determining average user consumption, average user responsiveness, or average user-initiated content proliferation with respect to feed life.

9. The method of claim 1, wherein executing an action in relation to the feed comprises discontinuing the feed, wherein the one or more feed metrics comprises a feed life feed metric, and wherein the feed life metric indicates that the feed is no longer active.

10. The method of claim 1, wherein executing an action in relation to the feed comprises characterizing the feed as being important, wherein the one or more feed metrics comprises a user consumption feed metric, and wherein the user consumption feed metric indicates that the feed has a high average user consumption.

11. The method of claim 1, wherein executing an action in relation to the feed comprises determining that the feed should be cached, wherein the one or more feed metrics comprises a user consumption feed metric and a user responsiveness feed metric, wherein the user consumption feed metric indicates that the feed has a high average user consumption, and wherein the user responsiveness feed metric indicates that the feed has a low average user responsiveness.

12. The method of claim 1, wherein executing an action in relation to the feed comprises determining that intervention in the feed is advisable, wherein the one or more feed metrics comprises a user responsiveness feed metric, and wherein the user responsiveness feed metric indicates that the feed has a high average user responsiveness.

13. The method of claim 1, wherein executing an action in relation to the feed comprises determining that a feed can be monetized, wherein the one or more feed metrics comprises a user-initiated content proliferation feed metric, and wherein the user-initiated content proliferation feed metric indicates that the feed has a high level of proliferation.

14. A computer program product comprising a non-transitory computer-readable medium storing a plurality of instructions for accessing feeds based on metrics, the instructions comprising:

program code to access a plurality of feeds, wherein each feed in the plurality of feeds is associated with an object stored in a database system;

program code to provide the plurality of feeds to a plurality of users of the database system;

program code to collect inferential user interaction data from the plurality of users, wherein the inferential user interaction data is generated in relation to at least one of a plurality of feeds, and wherein the inferential user interaction data captures implicit user behavior of at least one user of a plurality of users of the database system, wherein the program code is configured to receive data describing implicit user behavior, wherein the data was captured in part by client software operating on a computing device;

program code to determine, using one or more processors associated with one or more servers, one or more feed metrics based on the inferential user interaction data, wherein a feed metric is based upon statistics for the plurality of users comprising user consumption, user responsiveness, content proliferation, and feed life;

program code to weight the one or more feed metrics for the plurality of users with respect to each of the plurality of feeds; and program code to execute an action for the plurality of users in relation to at least one of the plurality of feeds based on the one or more weighted feed metrics, wherein the action comprises discontinuing the feed, characterizing a feed, determining that a feed can be monetized, determining that a feed should be cached, or determining that intervention in a feed is advisable.

15. The computer program product of claim 14, wherein the program code to determine the one or more feed metrics based on the inferential user interaction data comprises program code to determine the change in a feed metric over time.

16. The computer program product of claim 14, wherein the program code to determine the one or more feed metrics based on the inferential user interaction data comprises program code to determine a feed metric with respect to a subgroup of the plurality of users, wherein users in the subgroup share a common characteristic.

17. A system for accessing feeds based on metrics, the system comprising a database storing a plurality of objects, wherein the database is running on one or more servers; and one or more processors associated with the one or more servers, wherein the one or more processors are configured to perform the following operations:

access a plurality of feeds, wherein each feed in the plurality of feeds is associated with an object stored in the database;

provide the plurality of feeds to a plurality of users of the database system;

collect inferential user interaction data from the plurality of users, wherein the inferential user interaction data is generated in relation to at least one of a plurality of feeds, and wherein the inferential user interaction data captures implicit user behavior of at least one user of the plurality of users of the database system, wherein the one or more processors are further configured to receive data describing implicit user behavior, wherein the data was captured in part by client software operating on a computing device;

determine one or more feed metrics based on the inferential user interaction data, wherein a feed metric is based upon statistics for the plurality of users comprising user consumption, user responsiveness, content proliferation, and feed life;

weight the one or more feed metrics for the plurality of users with respect to each of the plurality of feeds; and execute an action for the plurality of users in relation to at least one of the plurality of feeds based on the one or more weighted feed metrics, wherein the action comprises discontinuing the feed, characterizing a feed, determining that a feed can be monetized, determining that a feed should be cached, or determining that intervention in a feed is advisable.

* * * * *